(12) United States Patent
Nagai et al.

(10) Patent No.: US 7,766,553 B2
(45) Date of Patent: Aug. 3, 2010

(54) BALL BEARING RETAINER, AND BALL BEARING EMPLOYING THE SAME

(75) Inventors: Setsuo Nagai, Osaka (JP); Kazuki Higashida, Osaka (JP); Takeshi Tsuda, Osaka (JP)

(73) Assignee: JTEKT Corporation, Osaka (JP)

( * ) Notice: Subject to any disclaimer, the term of this patent is extended or adjusted under 35 U.S.C. 154(b) by 539 days.

(21) Appl. No.: 11/792,363

(22) PCT Filed: Dec. 7, 2005

(86) PCT No.: PCT/JP2005/022429

§ 371 (c)(1),
(2), (4) Date: Jun. 6, 2007

(87) PCT Pub. No.: WO2006/062115

PCT Pub. Date: Jun. 15, 2006

(65) Prior Publication Data

US 2008/0159676 A1  Jul. 3, 2008

(30) Foreign Application Priority Data

Dec. 7, 2004 (JP) ............................. 2004-354489

(51) Int. Cl.
*F16C 33/38* (2006.01)
*F16C 33/41* (2006.01)
*F16C 33/44* (2006.01)

(52) U.S. Cl. .................. 384/523; 384/527; 384/531; 384/909; 384/911

(58) Field of Classification Search ................ 384/463, 384/470, 523, 527, 531–535, 575, 580, 909, 384/911
See application file for complete search history.

(56) References Cited

U.S. PATENT DOCUMENTS 3,743,369 A * 7/1973 Langstrom .................. 384/470

(Continued)

FOREIGN PATENT DOCUMENTS

JP      75014601 A * 5/1975

(Continued)

*Primary Examiner*—Marcus Charles
(74) *Attorney, Agent, or Firm*—Rabin & Berdo, PC

(57) ABSTRACT

An inventive ball bearing retainer (4) is entirely composed of a resin composition, and has pocket surfaces (6) for retaining balls (5) and projections (8) provided on the pocket surfaces (6) and containing a solid lubricant (CB). A ball bearing (1) incorporates the ball bearing retainer (4). By the effect of the solid lubricant (CB), the projections (8) are less liable to be worn out in a short period particularly when the ball bearing (1) is used in a higher temperature environment. The projections (8) define clearances between the balls (5) and the pocket surfaces (6), making it possible to maintain the effect of preventing noise, increase in the torque of the ball bearing (1), reduction of the service life of a lubricant and the like for a longer period of time.

10 Claims, 9 Drawing Sheets

U.S. PATENT DOCUMENTS

| | | | | |
|---|---|---|---|---|
| 4,133,588 | A | * 1/1979 | Earsley | 384/470 |
| 5,498,654 | A | 3/1996 | Shimasaki et al. | |
| 5,539,844 | A | 7/1996 | Tazumi et al. | |
| 5,988,891 | A | * 11/1999 | Yamamoto et al. | 384/463 |
| 6,367,981 | B1 | * 4/2002 | Yamamoto et al. | 384/527 |
| 6,371,655 | B1 | * 4/2002 | Fierling | 384/531 |
| 6,682,224 | B2 | * 1/2004 | Ooitsu et al. | 384/527 |

FOREIGN PATENT DOCUMENTS

| | | |
|---|---|---|
| JP | 1-158218 | 6/1989 |
| JP | 5-339593 | 12/1993 |
| JP | 7279970 | 10/1995 |
| JP | 10-068421 | 3/1998 |
| JP | 10-169658 | 6/1998 |
| JP | 11060948 A * | 3/1999 |
| JP | 3035766 | 2/2000 |
| JP | 2000087973 A * | 3/2000 |
| JP | 2001-241447 | 9/2001 |
| JP | 2001-241448 | 9/2001 |
| JP | 2001-289249 | 10/2001 |
| JP | 2002-130295 | 5/2002 |
| JP | 2002195269 A * | 7/2002 |
| JP | 2002295479 A * | 10/2002 |
| JP | 2003-004047 | 1/2003 |
| JP | 2003-065342 | 3/2003 |
| JP | 2003097573 A * | 4/2003 |
| JP | 2003-148630 | 5/2003 |
| JP | 2003232361 A * | 8/2003 |

* cited by examiner

BALL BEARING RETAINER, AND BALL BEARING EMPLOYING THE SAME

FIELD OF THE INVENTION

The present invention relates to a ball bearing retainer, and a ball bearing employing the same.

BACKGROUND ART

Exemplary ball bearing retainers to be incorporated in a ball bearing include a crown-shaped retainer (snap cage), a machined retainer (machined cage) and a wave-shaped retainer (ribbon cage), which are each composed of a resin or a metal. Such a ball bearing retainer includes a ring-shaped body to be disposed between inner and outer races of the ball bearing, and a plurality of pocket surfaces provided on the body to define a plurality of pockets for retaining balls of the ball bearing, the pocket surfaces each having a concaved spherical shape similar to the shape of the ball of the ball bearing and having a curvature radius slightly greater than the curvature radius of the ball, and defining openings in an inner surface and an outer surface of the ring-shaped body.

The ball bearing incorporating the ball bearing retainer suffers from a problem such that noise is liable to occur particularly when a higher viscosity lubricant is used for improvement of the service life of the ball bearing or when the ball bearing is rotated at a higher speed. The cause of the noise is conceivably as follows. When the ball bearing is rotated, the balls revolve between a pair of races and, at the same time, are pressed against the ball bearing retainer in wide-area contact with the respective pocket surfaces of the ball bearing retainer with the intervention of thin films of the lubricant (more strictly in sliding contact because of the rotation of the balls).

In the thin lubricant films formed between the surfaces of the balls and the pocket surfaces, however, the lubricant is less fluid and may stagnate. The stagnant lubricant has a higher viscous resistance to increase a resistance to the sliding contact. As a result, the noise is generated during the rotation of the ball bearing. At the same time, the ball bearing suffers from problems of increase in torque and reduction of the service life of the lubricant due to temperature increase.

For prevention of these problems, it is proposed that a projection is provided on at least one of the pocket surfaces defining the respective pockets in the vicinity of an opening in one of the inner and outer surfaces of the ring-shaped body as projecting from the corresponding pocket surface inward of the pocket (see Patent Document 1).

Patent Document 1: Japanese Patent No. 3035766 (Claim 1, and Paragraph Nos. 0003 to 0005 and 0012)

DISCLOSURE OF THE INVENTION

Problems to be Solved by the Invention

When the ball bearing retainer having the projection projecting from the pocket surface is incorporated in the ball bearing, the projection abuts against the ball, whereby clearances equivalent to the height of the projection are defined between the balls and the pocket surfaces. Therefore, the areas of the sliding contact between the balls and the pocket surfaces with the intervention of the very thin lubricant films are reduced during the rotation of the ball bearing as compared with the conventional case. This reduces resistance occurring between the balls and the pocket surfaces in sliding contact with each other with the intervention of the very thin lubricant films as compared with the conventional case, thereby preventing the noise during the rotation of the ball bearing. Further, the increase in the torque of the ball bearing and the reduction of the service life of the lubricant due to the temperature increase are prevented. However, the ball bearing retainer composed of the resin suffers from a problem such that the projection is liable to be worn out in a short period when the ball bearing is used in a higher temperature environment.

FIG. 13 is a sectional view schematically illustrating a section of the projection 8 of a prior art ball bearing retainer 4. Referring to FIG. 13, the ball bearing retainer 4 composed of the resin is generally prepared by injection molding or the like of a resin composition containing a resin and reinforcement fibers FB such as glass fibers or carbon fibers. However, it is difficult for the reinforcement fibers FB to enter a minute projection 8, so that the projection 8 is often composed of the resin alone as seen in FIG. 13. In addition, only a very limited distal portion of the projection 8 is constantly kept in sliding contact with the ball with the intervention of the very thin lubricant film during the rotation of the ball bearing. Therefore, particularly when the lubricant is depleted due to reduction of the viscosity thereof in the higher temperature environment, the projection 8 is liable to be worn out in a shorter period. The wear-out of the projection 8 may result in the noise, the increase in the torque of the ball bearing and the reduction of the service life of the lubricant as in the conventional case.

It is an object of the present invention to provide a ball bearing retainer of a resin including a projection which is less likely to be worn out in a short period particularly when the ball bearing is used in the higher temperature environment and hence makes it possible to properly maintain the effect of preventing the noise, the increase in the torque of the ball bearing, the reduction of the service life of the lubricant and the like for along period of time, and to provide a ball bearing employing the ball bearing retainer.

Means for Solving the Problems

The present invention provides a ball bearing retainer, which comprises a ring-shaped body entirely composed of a resin composition to be disposed between inner and outer races of a ball bearing, and a plurality of pocket surfaces provided on the body to define a plurality of pockets for retaining balls of the ball bearing, the pocket surfaces each having a concaved spherical shape similar to a shape of the ball of the ball bearing and each defining openings in an inner surface and an outer surface of the ring-shaped body, wherein at least one of the pocket surfaces defining the respective pockets has a projection provided in the vicinity of one of the openings defined in the inner and outer surfaces of the ring-shaped body as projecting from the pocket surface inward of the pocket, and at least the projection is composed of a resin composition containing a solid lubricant. The solid lubricant is preferably spherical carbon. The spherical carbon preferably has an average particle diameter not greater than 100 µm.

The present invention further provides a ball bearing, which comprises inner and outer races, the above-mentioned ball bearing retainer of the present invention disposed between the races, and a plurality of balls retained in the respective pockets of the ball bearing retainer and arranged to roll between the races.

Effects of the Invention

The ball bearing retainer of the present invention ensures lubrication between the projection and the ball by the solid lubricant contained in the projection even if a lubricant is depleted in the higher temperature environment. Therefore, particularly when the ball bearing is used in the higher temperature environment, the projection is prevented from being worn out in a short period, thereby making it possible to maintain the effect of preventing the noise, the increase in the torque of the ball bearing, the reduction of the service life of the lubricant and the like for a longer period of time.

Where the spherical carbon is employed as the solid lubricant, the spherical carbon has the following advantages.

a) The spherical carbon is spherical particles having a smaller particle diameter. Therefore, particularly when the ball bearing retainer is produced by injection molding, the spherical carbon is efficiently distributed to the vicinity of a skin layer defined in a surface of the projection.
b) Since the spherical carbon is inorganic and has excellent durability at high temperatures, the spherical carbon ensures proper lubrication even in the higher temperature environment.

Therefore, the lubrication between the projection and the ball is ensured to improve the effect of preventing the projection from being worn out in a short period particularly when the ball bearing is used in the higher temperature environment.

Where the average particle diameter of the spherical carbon is not greater than 100 μm, the minute spherical carbon particles are properly bound with each other by the resin to improve the toughness of the ball bearing retainer. Therefore, the durability of the ball bearing retainer is improved.

The ball bearing of the present invention incorporates the ball bearing retainer of the present invention. Therefore, the projection makes it possible to maintain the effect of preventing the noise, the increase in the torque, the reduction of the service life of the lubricant and the like for a longer period of time particularly when the ball bearing is used in the higher temperature environment.

DESCRIPTION OF REFERENCE CHARACTERS

| | |
|---|---|
| 1: | Ball bearing |
| 2, 3: | Races |
| 4: | Ball bearing retainer |
| 5: | Balls |
| 6: | Pocket surfaces |
| 61, 62: | Edges |
| 7: | Pockets |
| 8: | Projections |
| CB: | Solid lubricant |

Embodiments of the Invention

Figure 1:
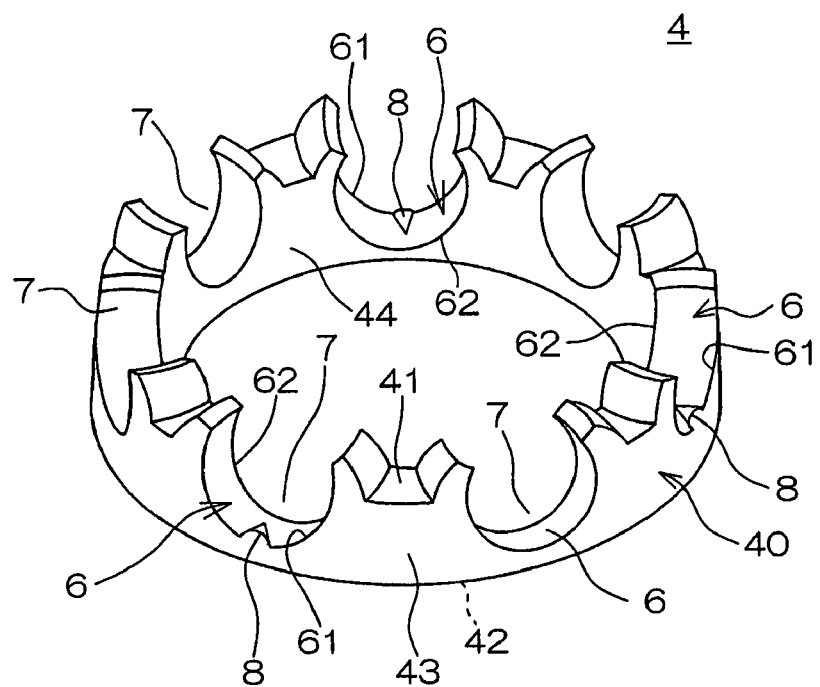
FIG. 1 is a perspective view illustrating the appearance of a crown-shaped retainer as a ball bearing retainer according to one embodiment of the present invention.
Figure 2:
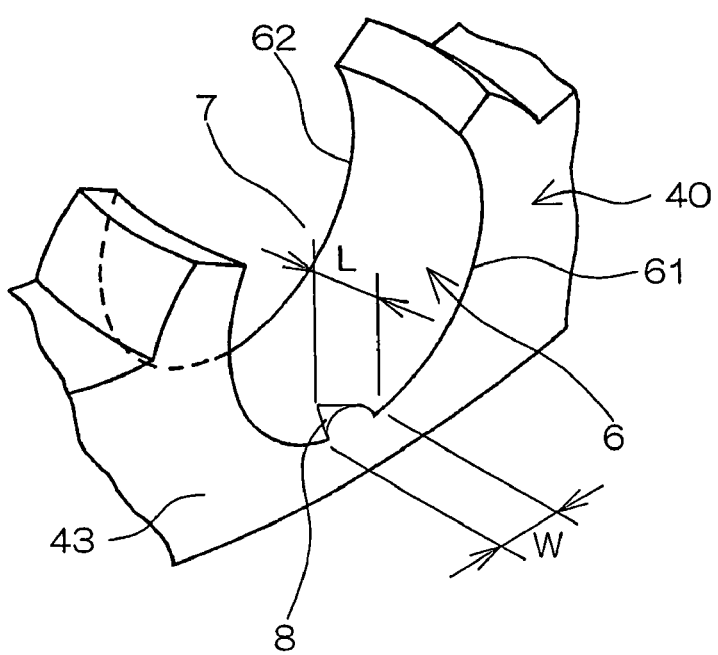
FIG. 2 is a perspective view illustrating a pocket having a projection as a main portion of the crown-shaped retainer of FIG. 1 on an enlarged scale.
Figure 3:
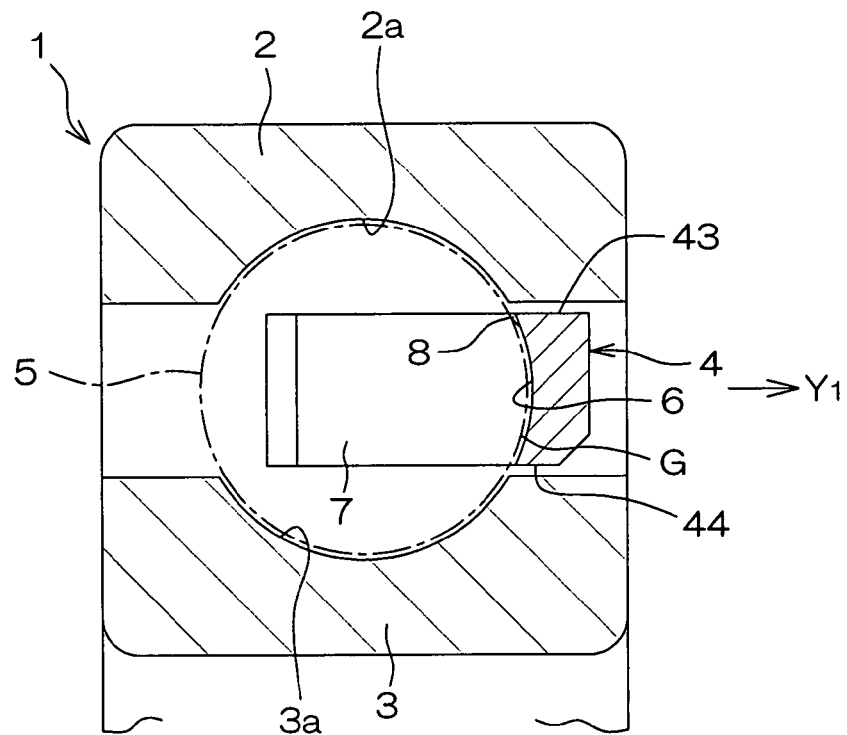
FIG. 3 is a vertical sectional view of a ball bearing incorporating the crown-shaped retainer of FIG. 1, taken perpendicularly to the circumference of the ball bearing.
Figure 4:
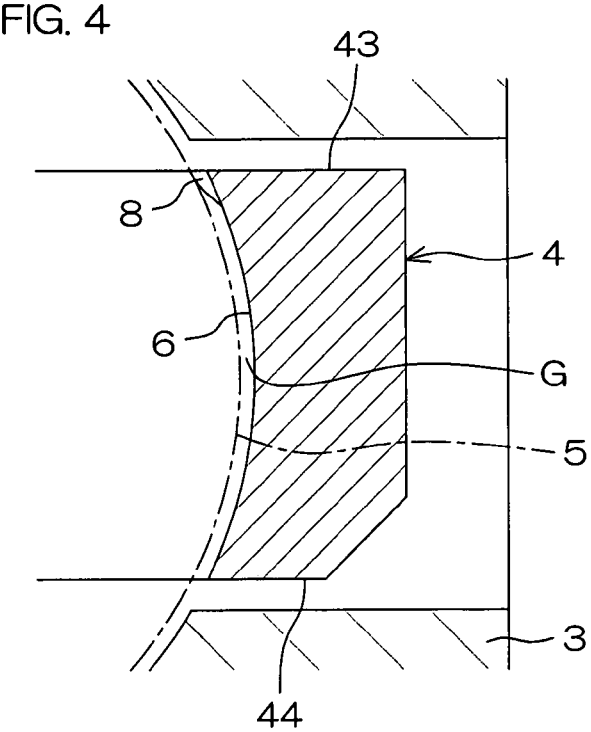
FIG. 4 is an enlarged sectional view of the projection shown in FIG. 3.

FIG. 1 is a perspective view illustrating the appearance of a crown-shaped retainer as a ball bearing retainer according to one embodiment of the present invention. FIG. 2 is a perspective view illustrating a pocket having a projection as a main portion of the crown-shaped retainer of FIG. 1 on an enlarged scale. FIG. 3 is a vertical sectional view of a ball bearing incorporating the crown-shaped retainer of FIG. 1, taken perpendicularly to the circumference of the ball bearing. FIG. 4 is an enlarged sectional view of the projection shown in FIG. 3.

Referring to FIG. 3, the crown-shaped retainer 4 of this embodiment is disposed between an outer race 2 and an inner race 3 of a ball bearing 1 for retaining a plurality of balls 5 rolling between race surfaces 2a and 3a of the races 2 and 3. Referring to FIG. 1, the crown-shaped retainer 4 includes a ring-shaped body 40, and a plurality of pocket surfaces 6 each concaved from one axial end face 41 toward the other axial end face 42 of the ring-shaped body 40 to define a plurality of pockets 7 for retaining the balls 5, the pocket surfaces 6 each having a concaved spherical shape similar to the shape of the ball 5 and having a curvature radius slightly greater than the curvature radius of the ball 5, and defining openings in an inner surface 44 and an outer surface 43 of the ring-shaped body 40. In the illustrated embodiment, projections 8 are respectively provided on three of the pocket surfaces 6.

Referring to FIGS. 2 and 3, the projections 8 are each provided on the pocket surface 6 at an innermost position on an edge 61 closest to the end face 42 of the body 40 as projecting inward of the pocket 7, the innermost position being defined by an intersection of a plane containing the center of the concaved spherical pocket surface 6 and the center axis of the ring-shaped body 40 and the edge 61 of the pocket surface 6 on the side of the outer surface 43 of the body 40. The projection 8 has a shape such as obtained by cutting a cone into halves along a plane containing the vertex of the cone and the center of the bottom of the cone, and the projection 8 is disposed on the pocket surface 6 with the bottom of the cone being flush with the outer surface 43 of the body 40 and with the vertex of the cone directing toward the center axis of the ring-shaped body 40.

Referring to FIGS. 3 and 4, when the crown-shaped retainer 4 having the projections 8 is incorporated in the ball bearing 1, the crown-shaped retainer 4 is slightly displaced axially to the side of the projections 8 as indicated by an arrow $Y_1$ in FIG. 3 by abutment of the projections 8 against the balls 5, whereby clearances G equivalent to the height of the projections 8 are defined between the balls 5 and the pocket surfaces 6. Therefore, the areas of sliding contact between the balls 5 and the pocket surfaces 6 with the intervention of very thin lubricant films are reduced during the rotation of the ball bearing 1 as compared with the prior art, thereby reducing the resistance occurring between the balls 5 and the pocket surfaces 6 in sliding contact with each other with the intervention of the thin lubricant films. This prevents the noise during the rotation of the ball bearing 1 and, at the same time, prevents the increase in the torque of the ball bearing 1, the reduction of the service life of the lubricant due to the temperature increase, and the like.

Figure 5:
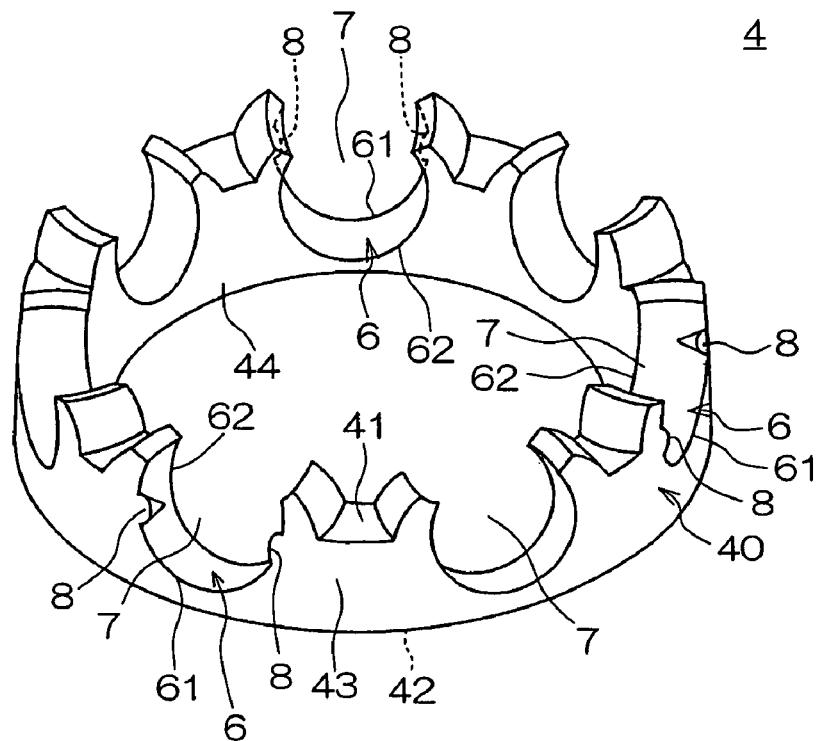
FIG. 5 is a perspective view illustrating the appearance of a crown-shaped retainer as a ball bearing retainer according to another embodiment of the present invention.
Figure 6:
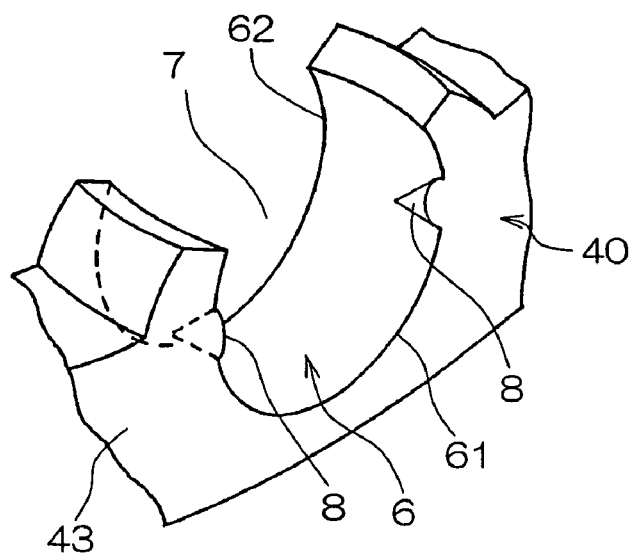
FIG. 6 is a perspective view illustrating a pocket having projections as a main portion of the crown-shaped retainer of FIG. 5 on an enlarged scale.

FIG. 5 is a perspective view illustrating the appearance of a crown-shaped retainer as a ball bearing retainer according to another embodiment of the present invention. FIG. 6 is a perspective view illustrating a pocket having projections as a main portion of the crown-shaped retainer of FIG. 5 on an enlarged scale. Referring to FIGS. 5 and 6, the crown-shaped retainer 4 differs from the retainer of the preceding embodiment shown in FIGS. 1 to 4 in that two projections 8 are provided on the pocket surface 6 on the edge 61 on the side of the outer surface 43 of the ring-shaped body 40 symmetrically with respect to the plane containing the center of the concaved spherical pocket surface 6 and the center axis of the ring-shaped body 40 as projecting inward of the pocket 7. Since the other parts have the same configurations as those in the preceding embodiment, the same parts will be denoted by the same reference characters and will not be explained.

The projections 8 each have the same shape as those in the preceding embodiment. That is, the projections 8 each have a shape such as obtained by cutting a cone into halves along a plane extending through the vertex of the cone and the center of the bottom of the cone. The projections 8 are each disposed on the pocket surface 6 with the bottom of the cone being flush with the outer surface 43 of the body 40 and with the vertex of the cone directing inward of the ring-shaped body 40.

When the prior art crown-shaped retainer 4 having no projection is incorporated in the ball bearing 1 and the ball bearing 1 is rotated, as described above, the balls 5 revolve between the races 2 and 3 and, at the same time, are pressed against the crown-shaped retainer 4 in wide-area sliding contact with the respective pocket surfaces 6 with the intervention of very thin lubricant films on the forward side thereof with respect to the direction of the revolution thereof. In this illustrative embodiment, on the other hand, a forward one of the two projections 8 with respect to the direction of the revolution of the ball 5 on the pocket surface 6 abuts against the ball 5, so that a clearance equivalent to the height of the projection 8 is defined between the ball 5 and the pocket surface 6.

Therefore, the areas of the sliding contact between the balls 5 and the pocket surfaces 6 with the intervention of very thin lubricant films are reduced during the rotation of the ball bearing 1 as compared with the prior art, thereby reducing the resistance occurring between the balls 5 and the pocket surfaces 6 in sliding contact with each other with the intervention of the very thin lubricant films. This prevents the noise during the rotation of the ball bearing 1 and, at the same time, prevents the increase in the torque of the ball bearing 1, the reduction of the service life of the lubricant due to the temperature increase, and the like.

Figure 7:
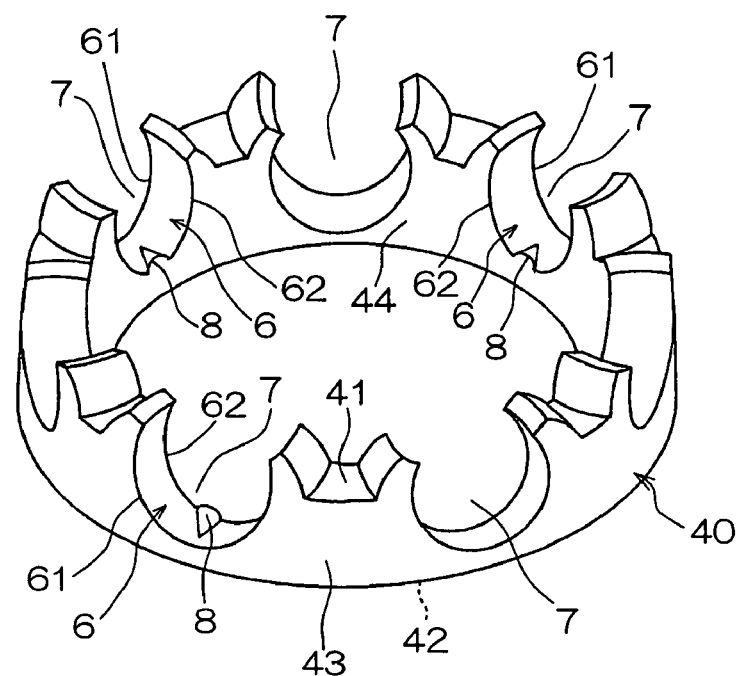
FIG. 7 is a perspective view illustrating the appearance of a crown-shaped retainer as a ball bearing retainer according to further another embodiment of the present invention.
Figure 8:
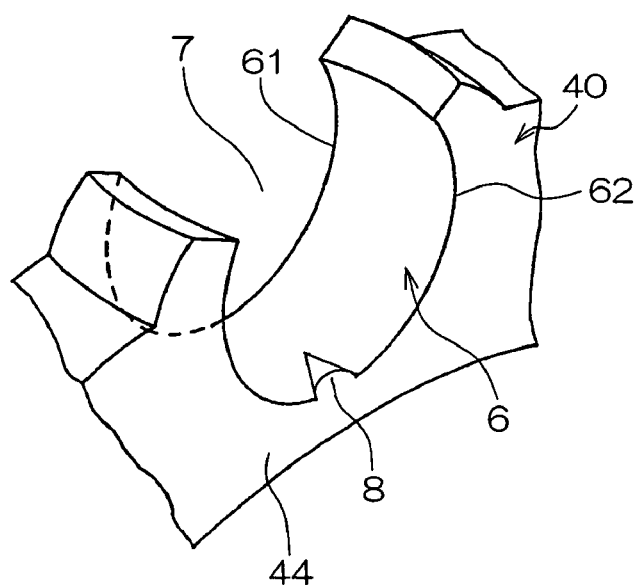
FIG. 8 is a perspective view illustrating a pocket having a projection as a main portion of the crown-shaped retainer of FIG. 7 on an enlarged scale.

FIG. 7 is a perspective view illustrating the appearance of a crown-shaped retainer as a ball bearing retainer according to further another embodiment of the present invention. FIG. 8 is a perspective view illustrating a pocket having a projection as a main portion of the crown-shaped retainer of FIG. 7 on an enlarged scale. Referring to FIGS. 7 and 8, the crown-shaped retainer 4 differs from the retainer of the aforesaid embodiment shown in FIGS. 1 to 4 in that the projections 8 are each disposed on the pocket surface 6 at an innermost position on an edge 62 closest to the end face 42 of the body 40 as projecting inward of the pocket 7, the inner most position being defined by an intersection of the plane containing the center of the concaved spherical pocket surface 6 and the center axis of the ring-shaped body 40 and the edge 62 of the pocket surface 6 on the side of the inner surface 44 of the body 40. Since the other parts have the same configurations as those in the aforesaid embodiment, the same parts will be denoted by the same reference characters and will not be explained.

The projection 8 has the same shape as that in the aforesaid embodiment. That is, the projection 8 has a shape such as obtained by cutting a cone into halves along the plane extending through the vertex of the cone and the center of the bottom of the cone. The projection 8 is disposed on the pocket surface 6 with the bottom of the cone being flush with the inner surface 44 of the body 40 and with the vertex of the cone directing outward of the ring-shaped body 40.

When the crown-shaped retainer 4 having the projections 8 is incorporated in the ball bearing 1, the crown-shaped retainer 4 is slightly displaced axially to the side of the projections 8 by abutment of the projections 8 against the balls 5, whereby clearances equivalent to the height of the projections 8 are defined between the balls 5 and the pocket surfaces 6. Therefore, the areas of the sliding contact between the balls 5 and the pocket surfaces 6 with the intervention of the very thin lubricant films are reduced during the rotation of the ball bearing 1 as compared with the prior art, thereby reducing the resistance occurring between the balls 5 and the pocket surfaces 6 in sliding contact with each other with the intervention of the very thin lubricant films. This prevents the noise during the rotation of the ball bearing 1 and, at the same time, prevents the increase in the torque of the ball bearing 1, the reduction of the service life of the lubricant due to the temperature increase, and the like.

Where two projections 8 are provided on the pocket surface 6 on the edge 62 on the side of the inner surface 44 of the body 40 symmetrically with respect to the plane containing the center of the concaved spherical pocket surface 6 and the center axis of the ring-shaped body 40, a forward one of the two projections 8 with respect to the direction of the revolution of the ball 5 on the pocket surface 6 abuts against the ball 5, so that a clearance equivalent to the height of the projection 8 is defined between the ball 5 and the pocket surface 6. Therefore, the same effects as in the embodiment of FIGS. 5 and 6 are provided.

Figure 9:
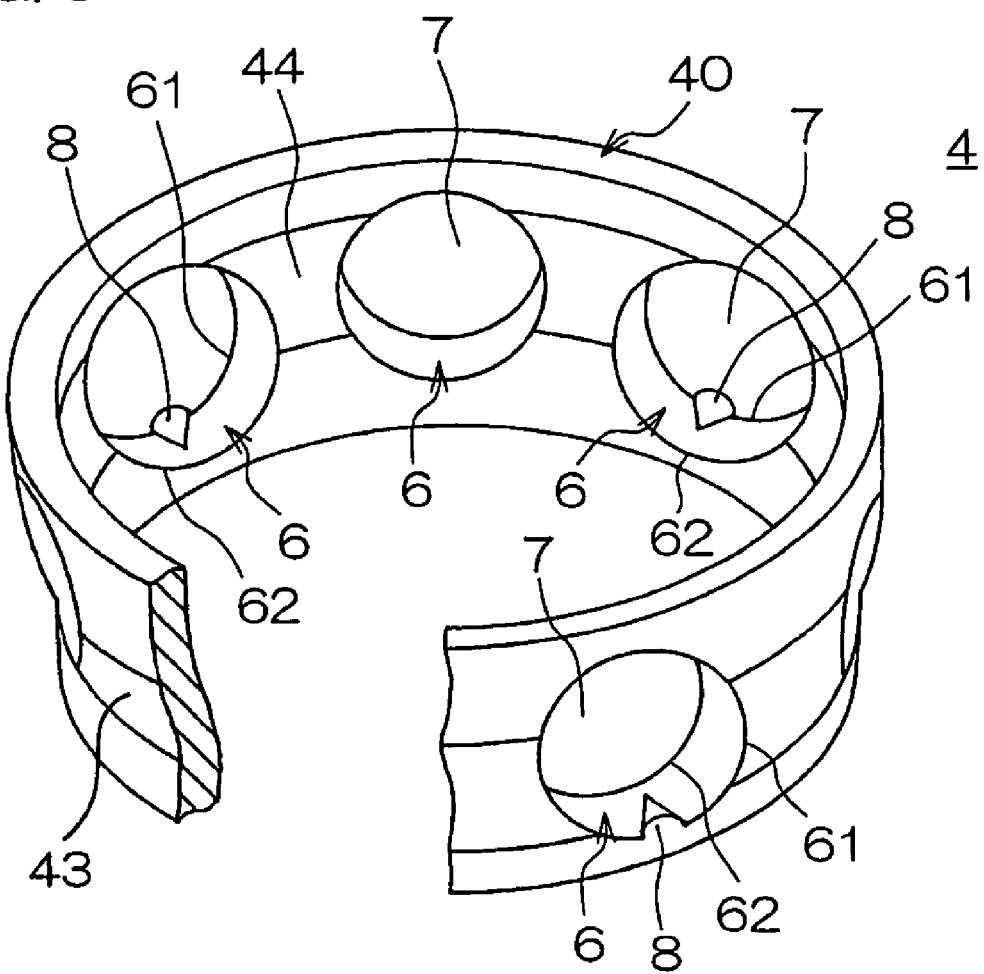
FIG. 9 is a partly cut-away perspective view illustrating the appearance of a machined retainer as a ball bearing retainer according to still another embodiment of the present invention.
Figure 10:
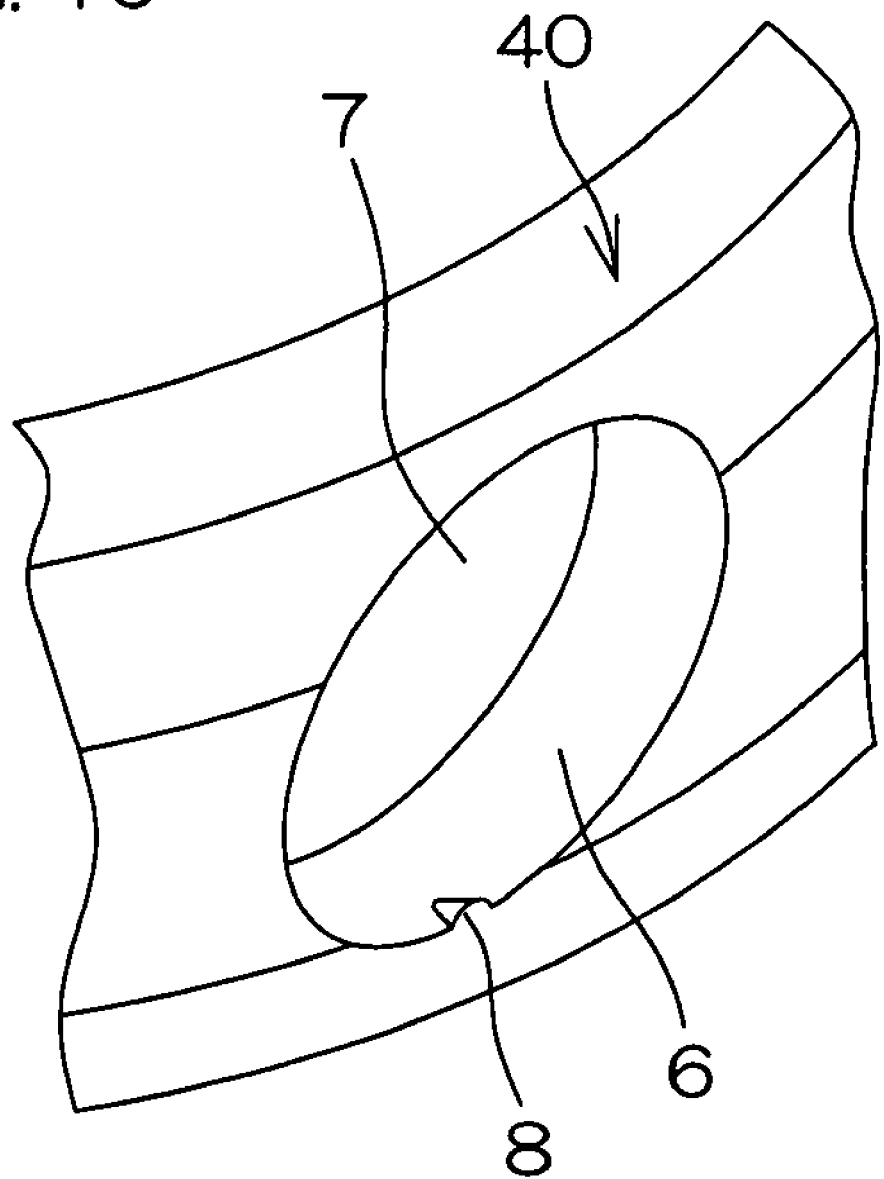
FIG. 10 is a perspective view illustrating a pocket having a projection as a main portion of the machined retainer of FIG. 9 on an enlarged scale.

FIG. 9 is a partly cut-away perspective view illustrating the appearance of a machined retainer as a ball bearing retainer according to still another embodiment of the present invention. FIG. 10 is a perspective view illustrating a pocket having a projection as a main portion of the machined retainer of FIG. 9 on an enlarged scale. Referring to FIGS. 9 and 10, the machined retainer 4 includes a ring-shaped body 40, and a plurality of pocket surfaces 6 extending through the body 40 from an inner surface 44 to an outer surface 43 of the ring-shaped body 40 to define a plurality of pockets 7 for retaining the balls 5, the pocket surfaces 6 each having a concaved spherical shape similar to the shape of the ball 5 having a curvature radius slightly greater than the curvature radius of the ball 5, and defining openings in the inner surface 44 and the outer surface 43 of the ring-shaped body 40. In the illustrated embodiment, projections 8 are respectively provided on three of the pocket surfaces 6.

The projections 8 are each provided on the pocket surface 6 at a position on an edge 61 closest to the end face 42 of the body 40 as projecting inward of the pocket 7, the position being defined by an intersection of a plane containing the center of the concaved spherical pocket surface 6 and the center axis of the ring-shaped body 40 and the edge 61 of the pocket surface 6 on the side of the outer surface 43 of the body 40. The projection 8 has a shape such as obtained by cutting a cone into halves along a plane containing the vertex of the cone and the center of the bottom of the cone. The projection 8 is disposed on the pocket surface 6 with the bottom of the cone being flush with the outer surface 43 of the body 40 and with the vertex of the cone directing toward the center axis of the ring-shaped body 40.

When the machined retainer 4 having the projections 8 is incorporated in a ball bearing 1, the machined retainer 4 is slightly displaced axially to the side of the projections 8 by abutment of the projections 8 against the balls 5 as in the embodiment shown in FIGS. 1 to 4, whereby clearances equivalent to the height of the projections 8 are defined between the balls 5 and the pocket surfaces 6. Therefore, the areas of sliding contact between the balls 5 and the pocket surfaces 6 with the intervention of very thin lubricant films are reduced during the rotation of the ball bearing 1 as compared with the prior art, thereby reducing resistance occurring between the balls 5 and the pocket surfaces 6 in sliding contact with each other with the intervention of the very thin lubricant films. This prevents the noise during the rotation of the ball bearing 1 and, at the same time, prevents the increase in the torque of the ball bearing 1, the reduction of the service life of the lubricant due to the temperature increase, and the like.

The projections 8 may be each disposed on the pocket surface 6 at a position on an edge 62 closest to the end face 42 of the body 40 as projecting inward of the pocket 7, the position being defined by an intersection of the plane containing the center of the concaved spherical pocket surface 6 and the center axis of the ring-shaped body 40 and the edge 62 of the pocket surface 6 on the side of the inner surface 44 of the body 40. Even in this case, the same effects are provided. Where two projections 8 are provided on the pocket surface 6 on the edge 62 on the side of the inner surface 44 of the body 40 symmetrically with respect to the plane containing the center of the concaved spherical pocket surface 6 and the center axis of the ring-shaped body 40, a forward one of the two projections 8 with respect to the direction of the revolution of the ball 5 on the pocket surface 6 abuts against the ball 5, so that a clearance equivalent to the height of the projection 8 is defined between the ball 5 and the pocket surface 6. Therefore, the same effects as in the embodiment shown in FIGS. 5 and 6 are provided.

The ball bearing retainers 4 of the embodiments shown in the foregoing figures are produced by injection molding of a resin composition. Any of various known resins which can be injection-molded for the production of the ball bearing retainers 4 are usable as a resin to be contained in the resin composition. Examples of the resins include polyether ether ketone (PEEK), polyphenylene sulfide-polyamideimide composite resins (PPS/PAI), polyamide (nylon) 4•6, polyamide (nylon) 6•6, polyphenylene sulfide (PPS), polyacetal (POM), tetrafluoroethylene-perfluoroalkoxyvinyl ether copolymer (PFA), phenol resins (PF), polysulfone (PSF), polyamide (nylon) 6, polyetherimide (PEI), polyether sulfone (PES) and aromatic polyamides (PPA), which may be used either alone or in combination.

Figure 11:
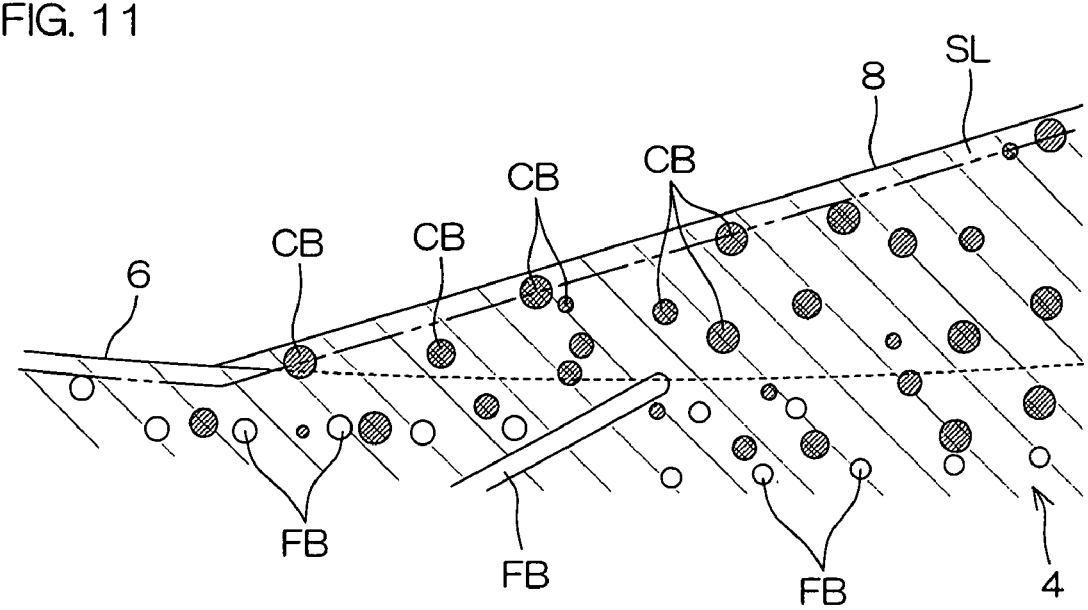
FIG. 11 is a sectional view schematically illustrating a section of the projection as the main portion of the ball bearing retainer of each of the embodiments shown in the foregoing figures.

FIG. 11 is a sectional view schematically illustrating a section of the projection as the main portion of the ball bearing retainer 4 of each of the embodiments shown in the foregoing figures. Referring to FIG. 11, according to the present invention, the projection 8 projecting from the pocket surface 6 inward of the pocket 7 should contain a solid lubricant CB in the ball bearing retainer 4 composed of the resin composition containing the aforesaid resin. Thus, even if the lubricant is depleted in the higher temperature environment, minute skin layers SL formed in surfaces of the projections 8 when the ball bearing retainer 4 is produced by the injection molding are abraded to expose the solid lubricant CB contained in the projections 8, thereby ensuring lubrication between the projections 8 and the balls 5. Therefore, particularly when the ball bearing is used in the higher temperature environment, the projections 8 are prevented from being worn out in a short period, making it possible to maintain the effect of preventing the noise, the increase in the torque of the bearing of the ball bearing retainer, the reduction of the service life of the lubricant and the like for a long period of time.

Preferred examples of the solid lubricant CB which are excellent in durability at high temperatures and ensure proper lubrication even in the higher temperature environment include inorganic solid lubricants such as spherical carbon, graphite, molybdenum disulfide, among which the spherical carbon is particularly preferred. The spherical carbon is spherical particles excellent in durability at high temperatures and having smaller particle diameters. Therefore, when a resin composition containing the resin and the spherical carbon is injection-molded, the spherical carbon is efficiently distributed to the vicinity of the skin layer SL formed in the surface of the ball bearing retainer 4 including the projections 8.

Consequently, particularly when the ball bearing retainer 4 is used in the higher temperature environment, the spherical carbon functions as the solid lubricant CB to ensure the lubrication between the projections 8 and the balls 5. This further improves the effect of preventing the projections 8 from being worn out in a short period. Any of various types of so-called carbon blacks having different particle diameters and properties may be used as the spherical carbon.

The average particle diameter of the spherical carbon is preferably not greater than 100 μm. If the average particle diameter is greater than the aforesaid range, the effect of properly binding the minute spherical carbon particles with the resin is reduced, whereby the ball bearing retainer 4 has an insufficient toughness and hence a reduced durability. The average particle diameter of the spherical carbon is particularly preferably 10 to 50 μm in the aforesaid range for improving the toughness of the ball bearing retainer 4 and enhancing the proper lubrication between the projections 8 and the balls 5 by the contained spherical carbon when the lubricant is depleted in the higher temperature environment.

The amount of the spherical carbon to be added is preferably 3 to 40 wt % based on the whole amount of the resin composition for the ball bearing retainer 4. If the amount is smaller than the aforesaid range, the amount of the spherical carbon distributed in the projections 8 is too small, failing to ensure sufficient lubrication between the projections 8 and the balls 5 by the contained spherical carbon when the lubricant is depleted in the higher temperature environment. This may result in wear-out of the projections 8 in a relatively short period. If the amount is greater than the aforesaid range, the proportion of the resin is relatively reduced, so that the ball bearing retainer 4 has an insufficient toughness and hence a reduced durability. Further, the resin composition has a reduced fluidity when being heated, so that the ball bearing retainer 4 cannot be properly molded by the injection molding. The amount of the spherical carbon to be added is particularly preferably 5 to 15 wt % even in the aforesaid range for ensuring the proper lubrication between the projections 8 and the balls 5 and improving the toughness of the ball bearing retainer 4 and the moldability of the ball bearing retainer 4.

As in the prior art, reinforcement fibers and/or a filler may be added to the resin composition for the ball bearing retainer 4 of the present invention, which fibers are substantially not in the projections, so that the projections are essentially free of the fibers. The reinforcement fibers and the filler increase the toughness of the entire ball bearing retainer 4, and improve the durability of the ball bearing retainer 4. Examples of the reinforcement fibers include glass fibers, carbon fibers, fibrous wallastonite, silicon carbide fibers, boron fibers, alumina fibers, Si—Ti—C—O fibers, metal fibers (such as of copper, steel and stainless steel), aromatic polyamide (aramid) fibers, potassium titanate whisker, graphite whisker, silicon carbide whisker, silicon nitride whisker and alumina whisker.

Examples of the filler include heat-resistant resin powder such as of phenol resins, silicone resins, fluorine-containing resins, polyamideimide resins, polyimide resins and aromatic polyamide resins, and inorganic powder such as of alumina, silica, silicon carbide, silicon nitride, talc, diatomite, asbestos, magnesium carbonate, calcium carbonate, glass beads and silica balloon. The amount of the reinforcement fibers and/or the filler to be added is preferably not smaller than 10 wt % based on the whole amount of the resin composition for the ball bearing retainer 4. If the amount is smaller than the aforesaid range, the effect of the addition of the reinforcement fibers for increasing the toughness of the entire ball bearing retainer 4 cannot be sufficiently provided.

Where the reinforcement fibers and/or the filler are added, the total amount of the reinforcement fibers and/or the filler and the spherical carbon to be added is preferably not greater than 50 wt % based on the whole amount of the resin composition for the ball bearing retainer 4. If the total amount is greater than the aforesaid range, the proportion of the resin is relatively reduced, so that the ball bearing retainer 4 has an insufficient toughness and hence a reduced durability. Further, the resin composition has a reduced fluidity when being heated, so that the ball bearing retainer 4 cannot be properly produced by the injection molding.

As in the prior art, the ball bearing retainers 4 of the present invention are each produced by the injection molding or the like of the resin composition containing the aforesaid constituents and having a pellet form, a powdery form or a like form which is usable as a molding material. In the ball bearing retainers 4 of the present invention thus produced, even the skin layers SL formed in the surfaces of the projections 8 projecting inward of the pockets 7 contain the solid lubricant CB such as the spherical carbon. Therefore, the lubrication between the projections 8 and the balls 5 is ensured even if the lubricant is depleted in the higher temperature environment. Therefore, particularly when the ball bearing is used in the higher temperature environment, the projections 8 are prevented from being worn out in a short period, making it possible to maintain the effect of preventing the noise, the increase in the torque of the ball bearing, the reduction of the service life of the lubricant and the like for a long period of time.

In the ball bearing 1 of the present invention, any of the ball bearing retainers 4 of the present invention is provided between the inner and outer races 2 and 3, and the balls 5 rolling between the races 2 and 3 are retained in the respective pockets 7. As in the prior art, the races 2, 3 and the balls 5 are composed of a metal such as bearing steel. In the ball bearing 1 of the present invention, the projections 8 of the incorporated ball bearing retainer 4 make it possible to maintain the effect of preventing the noise, the increase in the torque of the bearing of the ball bearing retainer, the reduction of the service life of the lubricant and the like for a long period of time particularly when the ball bearing 1 is used in the higher temperature environment.

EXAMPLES

Example 1

A resin composition was prepared by melting and kneading 60 parts by weight of a polyphenylene sulfide-polyamideimide composite resin, 10 parts by weight of spherical carbon having an average particle diameter of 15 μm and 30 parts by weight of glass fibers, and a crown-shaped retainer 4 having a shape shown in FIG. 1 was produced by injection-molding the resin composition.

Example 2

A resin composition was prepared by melting and kneading 60 parts by weight of polyether ether ketone, 10 parts by weight of spherical carbon having an average particle diameter of 15 μm and 30 parts by weight of glass fibers, and a crown-shaped retainer 4 having a shape shown in FIG. 1 was produced by injection-molding the resin composition.

Comparative Example 1

A resin composition was prepared by melting and kneading 70 parts by weight of a polyphenylene sulfide-polyamideimide composite resin and 30 parts by weight of glass fibers, and a crown-shaped retainer 4 having a shape shown in FIG. 1 was produced by injection-molding the resin composition.

Comparative Example 2

A resin composition was prepared by melting and kneading 70 parts by weight of polyether ether ketone and 30 parts by weight of glass fibers, and a crown-shaped retainer 4 having a shape shown in FIG. 1 was produced by injection-molding the resin composition.

<Rotation Test>

Figure 12:
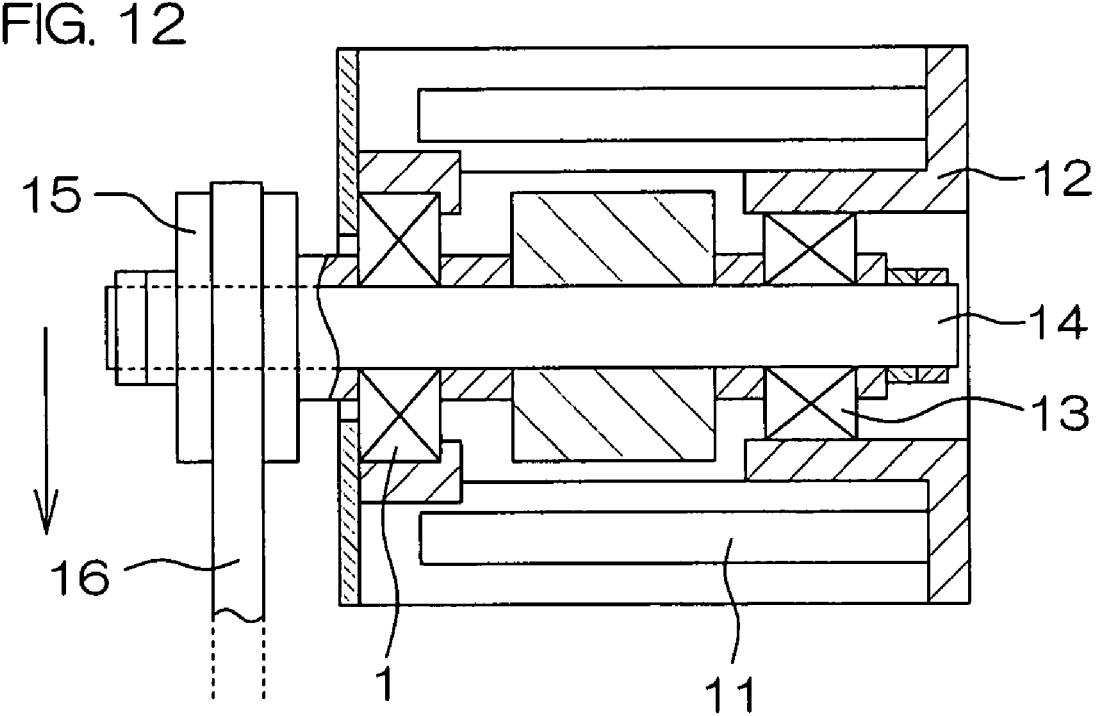
FIG. 12 is a sectional view of a test device used for performing a rotation test on crown-shaped retainers of Examples and Comparative Examples.
Figure 13:
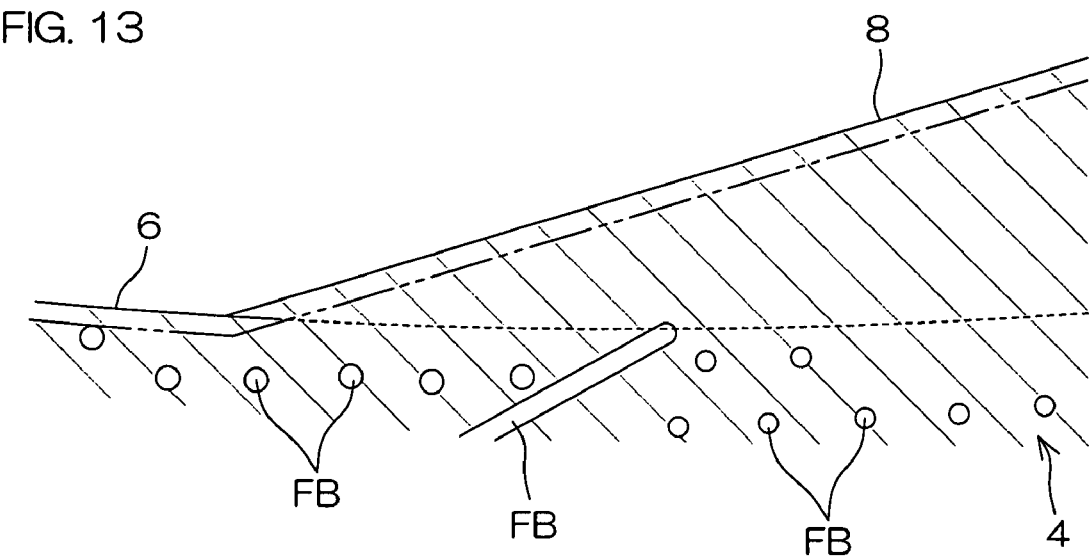
FIG. 13 is a sectional view schematically illustrating a section of a projection of a prior art ball bearing retainer.

The crown-shaped retainers 4 produced in Examples 1 and 2 and Comparative Examples 1 and 2 were each incorporated in a ball bearing 1, and the ball bearing 1 was incorporated in a test device shown in FIG. 12 with a predetermined amount of grease being filled therein. The illustrated test device included a stationary housing 12 having a cartridge heater 11 provided therein, a rotation shaft 14 rotatively supported by the ball bearing 1 to be tested disposed in a front portion of the stationary housing 12 and a bearing 13 disposed in a rear portion of the stationary housing 12, a pulley 15 fixed to a front end of the rotation shaft 14, and a poly-V-belt 16 stretched between the pulley 15 and a driving shaft of a motor not shown.

The ball bearing 1 to be tested was incorporated in the front portion of the test device, and a load was applied to the pulley 15 as indicated by a solid arrow in FIG. 12 by adjusting a tension of the poly-V-belt. Then, the motor was actuated to rotate the rotation shaft 14 at a rotation speed of 18,000 rpm. At the same time, energization of the cartridge heater 11 was started by a temperature regulating circuit not shown so as to regulate the temperature of the outer race of the ball bearing 1 to be tested at 200° C. as measured by a thermocouple also not shown. After the outer race temperature reached 200° C., the motor was continuously rotated for 160 hours. Then, the crown-shaped retainer 4 was taken out of the ball bearing 1, and the state of the projections 8 was checked. The results are shown in Table 1.

TABLE 1

|  | Resin | Spherical carbon | State of projections after rotation test |
|---|---|---|---|
| Example 1 | PPS/PAI | Added | Projections remained |
| Example 2 | PEEK | Added | Projections remained |
| Comparative Example 1 | PPS/PAI | Not added | Worn out |
| Comparative Example 2 | PEEK | Not added | Worn out |

As can be understood from the table, the projections 8 of the crown-shaped retainers 4 of Comparative Examples 1 and 2 not containing the spherical carbon were completely worn out in the rotation test. On the contrary, the projections 8 of the crown-shaped retainers 4 of Examples 1 and 2 were left unworn after the rotation test. Thus, it was confirmed that the addition of the spherical carbon ensures the lubrication between the projections 8 and the balls 5 and prevents the projections 8 from being worn out in a short period, whereby the projections 8 can maintain the effect of preventing the noise, the increase in the torque of the ball bearing 1, the reduction of the service life of the lubricant and the like for a long period of time.

The invention claimed is:

1. A ball bearing retainer formed by injection molding of a resin composition containing spherical carbons and reinforcement fibers, comprising:
   a ring-shaped body entirely composed of the resin composition to be disposed between inner and outer races of a ball bearing; and
   a plurality of pocket surfaces provided on the body to define a plurality of pockets for retaining balls of the ball bearing, the pocket surfaces each having a concaved spherical shape similar to a shape of the ball of the ball bearing and each defining openings in an inner surface and an outer surface of the ring-shaped body,
   wherein at least one of the pocket surfaces defining the respective pockets has a projection provided in the vicinity of one of the openings defined in the inner and outer surfaces of the ring-shaped body as projecting from the pocket surface inward of the pocket,
   wherein at least the resin composition forming the projection contains the spherical carbons,
   wherein the reinforcement fibers hardly enter the resin composition forming the projection, from the resin composition composing the body, so that the projection has a lower concentration of the reinforcement fibers compared to the body, and
   wherein an amount of the spherical carbons in the resin composition is 3 wt % to 40 wt % based on the whole amount of the resin composition.

2. A ball bearing retainer as set forth in claim 1, wherein the spherical carbon has an average particle diameter not greater than 100 μm.

3. A ball bearing, comprising:
   inner and outer races;
   a ball bearing retainer as recited in claim 1 disposed between the races; and
   a plurality of balls retained in the respective pockets of the ball bearing retainer and arranged to roll between the races.

4. A ball bearing retainer as set forth in claim 1, wherein the spherical carbons are distributed to a vicinity of a skin layer defined at a surface of the projections, when the ball bearing retainer is produced by the injection molding.

5. A ball bearing retainer as set forth in claim 1, wherein the projection is essentially free of the reinforcement fibers.

6. A ball bearing retainer as set forth in claim 1, wherein the amount of the spherical carbons in the resin composition is 5 wt % to 15 wt % based on the whole amount of the resin composition.

7. A ball bearing retainer as set forth in claim 6, wherein an amount of the reinforcement fibers in the resin composition is 10 wt % or greater based on the whole amount of the resin composition.

8. A ball bearing retainer as set forth in claim 7, wherein a total amount of the reinforcement fibers and the spherical carbons in the resin composition is 50 wt % or less based on the whole amount of the resin composition.

9. A ball bearing retainer as set forth in claim 1, wherein an amount of the reinforcement fibers in the resin composition is 10 wt % or greater based on the whole amount of the resin composition.

10. A ball bearing retainer as set forth in claim 1, wherein a total amount of the reinforcement fibers and the spherical carbons in the resin composition is 50 wt % or less based on the whole amount of the resin composition.

* * * * *